United States Patent [19]

Baba et al.

[11] Patent Number: 4,739,223

[45] Date of Patent: Apr. 19, 1988

[54] HEADLIGHT UNIT

[75] Inventors: Masaharu Baba; Nobuhiko Hayashi, both of Yokohama, Japan

[73] Assignee: Kabushiki Kaisha Toshiba, Kawasaki, Japan

[21] Appl. No.: 919,504

[22] Filed: Oct. 16, 1986

[30] Foreign Application Priority Data

Oct. 18, 1985 [JP] Japan ................................ 60-233074

[51] Int. Cl.$^4$ ................................................ B60Q 1/02

[52] U.S. Cl. ........................................ 315/82; 362/66; 362/285; 362/296

[58] Field of Search .................... 315/82; 362/66, 296, 362/286, 285

[56] References Cited

U.S. PATENT DOCUMENTS

| | | | |
|---|---|---|---|
| 1,259,252 | 3/1918 | McCaskey | 315/82 |
| 1,819,690 | 8/1931 | Ricker | 315/82 |
| 3,079,529 | 2/1963 | Novinger | 315/82 |
| 4,186,428 | 1/1980 | Deverrewaere | 362/66 |
| 4,513,357 | 4/1985 | Nieda et al. . | |
| 4,533,860 | 8/1985 | Saito | 315/82 |
| 4,620,267 | 10/1986 | Cibie | 362/66 |

FOREIGN PATENT DOCUMENTS

| | | |
|---|---|---|
| 3813796 | 12/1963 | Japan . |
| 47-7746 | 3/1972 | Japan . |
| 47-35154 | 9/1972 | Japan . |

*Primary Examiner*—Harold Dixon

*Attorney, Agent, or Firm*—Oblon, Fisher, Spivak, McClelland & Maier

[57] ABSTRACT

This invention provides a headlight unit comprising: a light source; reflector means for reflecting the light from the light source into a beam; and circuit means for adjusting the position of the beam and for controlling the degree of rotation of the reflecting means.

6 Claims, 2 Drawing Sheets

HEADLIGHT UNIT

BACKGROUND OF THE INVENTION

1. Field of the Invention

This invention relates to a headlight unit, and in particularly to a headlight unit for motor vehicles, such as cars, in which the high beam and the low beam are obtained by rotating a reflecting mirror.

2. Description of the Prior Art

In the case of car headlights, there is a requirement for switching between a high beam and a low beam, and two principal systems are used for this purpose.

One of these utilized a sealed beam type lamp in which two light sources are provided in conjunction with a reflecting mirror. When one of these light sources is operated, the low beam is generated, and when the other light source is operated or both light sources are operated at the same time, the high beam is generated. In this type lamp the beams are switched by switching the light sources.

In the other system, one light source is utilized with a reflecting mirror. The beam is switched by rotating the reflecting mirror or the light source, itself, upward and downward.

This invention relates to the latter system, the problems of which are discussed below.

In headlights which switch between low beam and high beam, the downward attitude of the reflecting mirror when the low beam is lit must be controlled with great accuracy to avoid blinding oncoming traffic. Previously, a vertical aiming bolt and a surrounding coil spring have been used to control the attitude of the reflecting mirror in the vertical direction. This bolt acts as a stopper, which controls the downward attitude position of the reflecting mirror. In addition, the spring is designed to permit the rotation of the reflecting mirror to allow upward rotation. Moreover, an actuator is used to make the reflecting mirror rotate upward and downward. Hitherto, solenoid systems, compressed gas systems, or motor drive systems have been used as actuators.

A headlight system which uses this kind of actuator with a vertical direction aiming bolt controls the downward attitude position of the reflecting mirror through the vertical aiming bolt, and determines the high beam direction by rotation of the reflecting mirror upward in response to the working stroke of the actuator.

Although this type of headlight is susceptible to errors such as errors in manufacture of the reflecting mirror, manufacturing errors and installation errors in the light source, and installation errors in the attitude of the reflecting mirror in the vehicle, adjustments to correct such errors can be carried out after installing the headlight on the vehicle body.

When making such adjustments, the position for the downward attitude of the reflecting mirror is determined by adjusting the vertical direction aiming bolt. Then, the upward position is adjusted by operating the actuator.

In the past a two-stage adjustment operation has been necessary for making this kind of adjustment. First, the position of the downward attitude of the reflecting mirror must be determined by the vertical aiming bolt. Then the rotation of the reflecting mirror must be adjusted by adjusting the working stroke of the actuator. These operations result in adjustment of the angles of dip and elevation of the low beam and the high beam, but the multistage process takes too long. In particular, during periodic maintenance including vertical aiming adjustment, the working stroke of the actuator also has to be readjusted, and this makes the work more complicated.

Moreover, the need for a vertical aiming bolt and spring increases the number of parts, and makes the assembly work more complicated.

The present invention provides a headlight unit of a simpler construction in which vertical aiming adjustments of the reflecting mirror and rotational adjustments of the reflecting mirror can be easily carried out and, at the same time, the need for a vertical aiming bolt and spring can be eliminated.

SUMMARY OF THE INVENTION

Accordingly, an object of this invention is to simplify the adjustment of a headlight unit having a movable reflector.

It is a further object of the invention to reduce the number of parts of an adjustable headlight unit.

Another object of the invention is to provide a headlight unit having a motor with an adjustable angle of rotation, for example a servo-motor or a stepping motor, as the actuator, and a controller to control this motor. Besides this controller being designed to control the vertical aiming position of the headlight by controlling the angle of rotation of the motor, it is also designed to adjust the aiming position of the headlight beam.

This invention provides a headlight unit comprising: a light source; reflector means for reflecting the light from the light source into a beam; and circuit means for adjusting the position of the beam and for controlling the degree of rotation of the reflecting means.

DETAILED DESCRIPTION OF THE PREFERRED EMBODIMENTS

Figure 1:
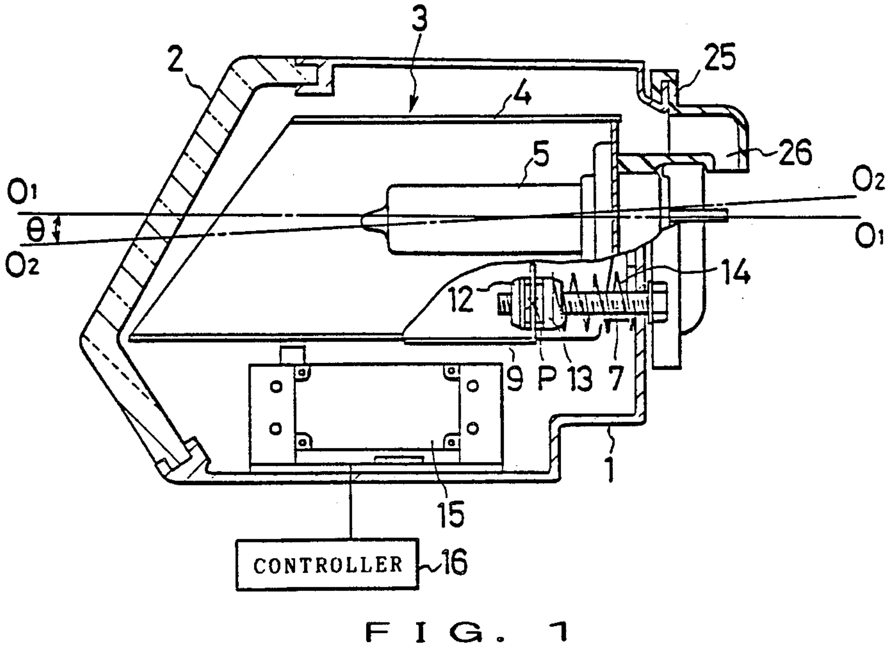
FIG. 1 is a vertical transverse cross-sectional view of a headlight unit according to this invention.

This invention is described below with reference to drawings.

In the drawings, a housing 1 is secured to the car body (not shown). A transparent cover 2 then transmits the beam projected from the headlight unit in the forward direction and plays the role of the front lens. Headlight 3 is housed in the space enclosed by housing 1 and transparent cover 2.

Headlight 3 is constructed by housing a light source, for instance a small metal vapour discharge lamp 5, in a reflecting mirror 4. Reflecting mirror 4 is formed of a metal with high reflectivity, such as bright aluminium.

Reflecting mirror 4 is supported on housing 1 by center pivot 6 and light/right directional aiming bolt 7. In addition, brackets 8 and 9 are connected to the back of reflecting mirror 4. A rod 10 which supports center pivot 6 is secured to housing 1. Left/right directional aiming bolt 7 is inserted through housing 1. On one side, bracket 8 is connected to rod 10 of center pivot 6 through ball joint 11, which is free to rotate. On the other side, left/right directional aiming bolt 7 is inserted through bracket 9. A nut 12, a spring washer 13 and a spring 14 are fitted to this left/right directional aiming bolt 7.

The position of this bracket 9 can be altered by adjusting the position of nut 12. By this position change, it becomes possible for reflecting mirror 4 to rotate to the left or right (in the directions of arrow A in FIG. 2) about ball joint 11. Therefore, the left/right direction of reflecting mirror 4 (in the directions of arrow A in FIG. 2) can be adjusted by left/right directional aiming bolt 7. Moreover, reflecting mirror 4 is supported in such a way that its front opening is capable of rotating upward and downward about the line P—P (shown by point P in FIG. 1) drawn between ball joint 11 of center pivot 6 and nut 12 of left/right directional aiming bolt 7.

This type of reflecting mirror 4 is rotated upward and downward by actuator 15, which is fitted in the bottom of housing 1. Actuator 15 is, for example, composed of a direct current type servo-motor. The angle of rotation of this motor is controlled by controller 16 shown in FIG. 3.

Controller 16 is constructed as follows. Numeral 17 designates an encoder, numeral 18 designates an adder and numeral 19 designates a high beam/low beam changeover switch. The numeral 20 designates an adjuster to adjust the amount of vertical rotation $\theta$ of the headlight, and is composed of variable resistors, etc. The numeral 21 designates an adjuster for adjusting the vertical aiming and is also composed of variable resistors, etc. The numeral 22 designates an auxiliary resistor.

Controller 16 constructed in this way is connected to the headlight main switch 23. Headlight main switch 23 is connected to a small metal-vapour discharge lamp 5, which is the light source, and to the lighting circuit 24.

A rubber cover 25 covers the open section at the back of housing 1 and insulates the supply terminals of small metal-vapour discharge lamp 5. Rubber cover 25 permits the movement of small metal-vapour discharge lamp 5 when reflecting mirror 4 is rotated upward or downward. Moreover, a water drain hole 26 is formed in this rubber cover 25. Water drain hole 26 allows water to drain out when it has penetrated the upper part of reflecting mirror 4.

The operation of a headlight of this construction is explained below.

When small metal-vapour discharge lamp 5, which is the light source, is lit by closing headlight main switch 23, the light emitted from this light source is reflected by reflecting mirror 4 and is projected forward as a beam. This beam passes through transparent cover 2 and illuminates the road surface ahead.

Figure 2:
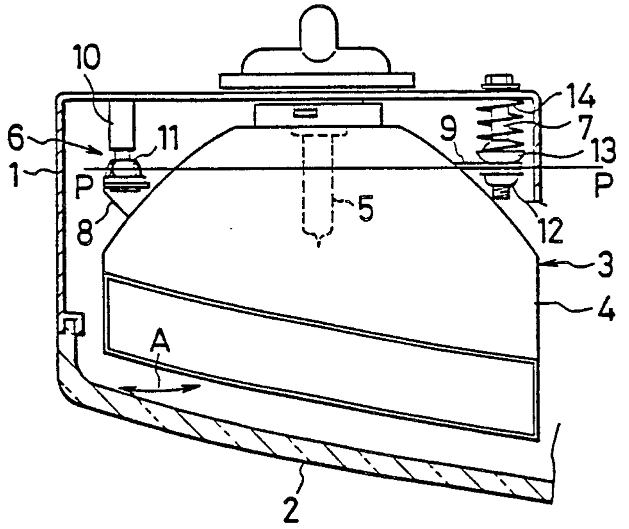
FIG. 2 is a transverse cross-sectional view of a headlight unit according to this invention.

In this case, when servo-motor 15, which is the actuatoris operated, headlight 3 rotates about center-line of rotation P—P and the axis of the beam can be rotated upward or downward between the lines $0_1—0_1$ and $0_2—0_2$, as shown in FIG. 1.

When the beam coincides with the line $0_1—0_1$, the high beam is obtained, and when it coincides with the line $0_2—0_2$, the low beam is obtained. However, upward beam $0_1—0_1$ and downward beam $0_2—0_2$ must each be set with great accuracy. The directions of these beams are determined by the amount of rotation $\theta$ of headlight 3 and the vertical aiming position.

Figure 3:
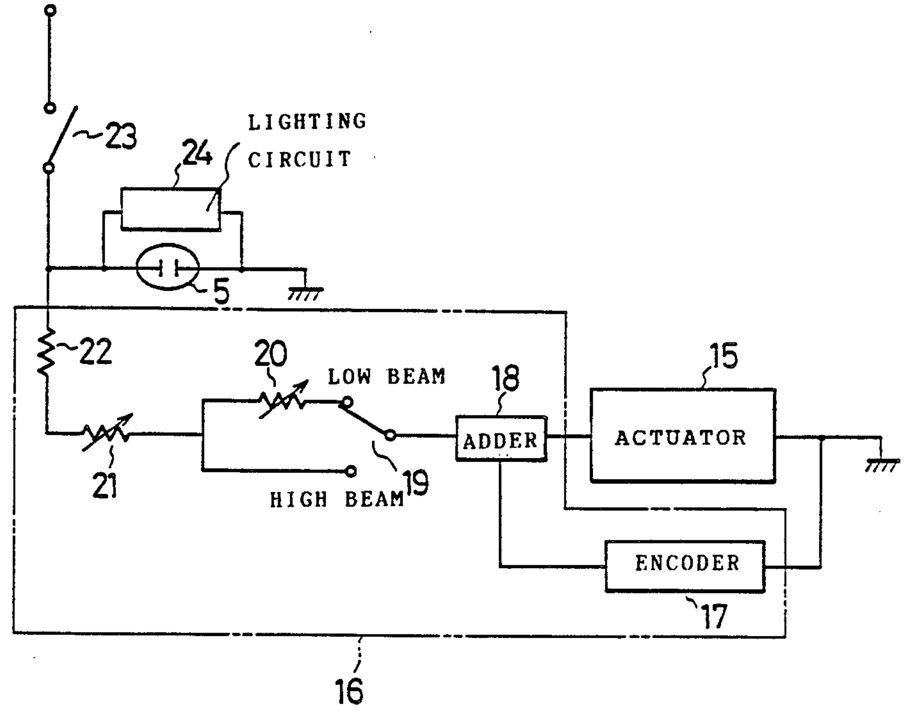
FIG. 3 is a schematic diagram of a control circuit using the headlight unit of FIGS. 1 and 2.

In the embodiment the amount of rotation $\theta$ of headlight 3 and the vertical aiming position can be adjusted by servo-motor 15, which acts as the actuator. As shown in FIG. 3, when the resistance of vertical aiming adjuster 21 is adjusted in the state where the main switch 23 for the headlight is closed and changeover switch 19 is connected to the high beam side, the amount of rotation of servo-motor 15 is determined according to the value of this resistance (according to the voltage level). This amount of rotation of servo-motor 15 determines the direction of upward beam $0_1—0_1$ by rotating headlight 3. Thus, it determines the vertical aiming position.

After this aiming is set, when changeover switch 19 is connected to the low beam side and the resistance value of rotation adjuster 20 is adjusted, the amount of rotation of servo-motor 15 is determined according to the value of this resistance (according to the voltage level). This amount of rotation of servo-motor 15 determines the direction of downward beam $0_2—0_2$ by rotating headlight 3. Thus, it determines the amount of rotation $\theta$ of headlight 3.

As a result, when headlight main switch 23 is closed and changeover switch 19 is connected to the high beam side, encoder 17 and adder 18 control the angle of rotation of servo-motor 15 in response to the voltage level amount reduced by the resistance of vertical aiming adjuster 21. Headlight 3 is rotated upward by this angle of rotation of servo-motor 15, so that upward beam $0_1—0_1$ is projected.

Also, when headlight main switch 23 is closed and changeover switch 19 is connected to the low beam side, encoder 17 and adder 18 control the angle of rotation of servo-motor 15 in response to the voltage level amount, reduced by the sum of the resistance of vertical aiming adjuster 21 and the resistance of rotation amount adjuster 20. Headlight 3 is rotated downward by this angle of rotation of servo-motor 15, so that downward beam $0_2—0_2$ is projected.

Moreover, when it is necessary to adjust the vertical aiming position, only the resistance value of vertical aiming adjuster 21 need be changed. In this case, even when vertical aiming adjuster 21 is adjusted, since there is no need to alter the amount of vertical rotation $\theta$ of the headlight, there is no need to readjust rotation amount adjuster 20.

Also, when it is necessary to adjust the upward and downward rotation $\theta$, only the resistance value of rotation adjuster 20 need be changed. In this case, even when rotation adjuster 20 is adjusted, there is no need to readjust vertical aiming adjuster 21 since there is no need to alter the vertical aiming position of the headlight.

Since there is no longer a requirement for the vertical aiming bolt and spring if this invention is used, the number of parts is reduced, and the assembly work in conjunction with these is also eliminated.

Furthermore, since the vertical aiming adjustment and the rotation amount $\theta$ can be carried out independently from each other, there is no complicated work such as readjusting the one after the other is adjusted.

Although in the embodiment, a servo-motor is used to control the angle of rotation, it is also possible to use a step motor.

Moreover, the position of installation of the actuator is not confined to the lower part of the headlight. It also could be installed in the upper part or rear part of the headlight.

Furthermore, this invention is not restricted to the use of small metal-vapour discharge lamps as light sources. Incandescent bulbs, such as halogen bulbs, also could be used.

The invention is capable of use with, for example, sealed beam lamps, etc, when lamps housing single light sources and their envelopes are operated together by actuators.

According to this invention described above, since, as well as adjusting the vertical aiming position of the headlight, the amount of vertical rotation of the headlight is also adjusted by using a motor which can control the angle of rotation as the actuator and controlling this motor by a controller, the conventional vertical aiming bolt and spring can be eliminated. Moreover, adjustment of the vertical position determination and adjustment of the amount of rotation of the reflecting mirror can be carried out independently from each other or in succession using a single motor. Also, the work of adjustment is simple, since even if one is adjusted there is no need to readjust the other.

Various modifications and variations could be made to the invention without departing from the scope or spirit of the invention.

What is claimed is:

1. A head light unit comprising:

a light source;

movable reflector means positionable at one of a first and a second positions for reflecting the light from the light source;

means for manually selecting one of the first and the second positions of the reflector;

electric actuator means responsive to the selecting means and coupled to the reflector means for positioning the reflector means to one of the first and the second positions.

first variable resistor means for manually determining the first position of the reflector means by providing a first adjustment to the actuator means for reflecting the light from the light source in the first predetermined direction when the reflector means is situated at the first position; and second variable resistor means connected to the first variable resistor means for manually determining the second position of the reflector means by providing a second adjustment to the actuator means on the basis of the first adjustment of the first variable resistor means for reflecting the light from the light source in a second predetermined direction different to the first direction when the reflector means is situated at the second position.

2. A unit according to claim 1, wherein the first position is a high beam position.

3. A unit according to claim 2, wherein the second position is a low beam position.

4. A headlight unit according to claim 1 wherein the actuator includes a motor having an adjustable angle of rotation.

5. A headlight unit according to claim 4 wherein the motor is a servo-motor.

6. A headlight unit according to claim 4 wherein the motor is a stepping motor.

* * * * *